US012719269B2

(12) United States Patent
Grimaud et al.

(10) Patent No.: US 12,719,269 B2
(45) Date of Patent: Aug. 25, 2026

(54) POWER SUPPLY SYSTEM FOR AN AIRCRAFT ACTUATOR

(71) Applicant: SAFRAN ELECTRONICS & DEFENSE, Paris (FR)

(72) Inventors: Louis Grimaud, Moissy-Cramayel (FR); Didier Moroni, Moissy-Cramayel (FR); Mehdi Besseghair, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 100 days.

(21) Appl. No.: 18/263,991

(22) PCT Filed: Feb. 3, 2022

(86) PCT No.: PCT/EP2022/052630
§ 371 (c)(1),
(2) Date: Aug. 2, 2023

(87) PCT Pub. No.: WO2022/167546
PCT Pub. Date: Aug. 11, 2022

(65) Prior Publication Data

US 2024/0128746 A1 Apr. 18, 2024

(30) Foreign Application Priority Data

Feb. 3, 2021 (FR) ....................................... 2101037

(51) Int. Cl.
*H02J 1/08* (2026.01)
*B64D 41/00* (2006.01)
(Continued)

(52) U.S. Cl.
CPC .............. *H02J 1/082* (2020.01); *B64D 41/00* (2013.01); *H02J 1/14* (2013.01); *H02J 7/345* (2013.01);
(Continued)

(58) Field of Classification Search
CPC .. H02M 1/007; H02M 1/4208; H02M 3/1582; H02M 3/33573; H02M 3/33584
See application file for complete search history.

(56) References Cited

U.S. PATENT DOCUMENTS

| | | | | |
|---|---|---|---|---|
| 8,164,283 | B2 * | 4/2012 | Sheahan, Jr. | H02J 7/1438 244/99.2 |
| 2010/0109581 | A1 * | 5/2010 | Sheahan, Jr. | H02J 7/34 307/9.1 |
| 2022/0185497 | A1 * | 6/2022 | Barraco | H02J 7/345 |

FOREIGN PATENT DOCUMENTS

| | | | | |
|---|---|---|---|---|
| DE | 102016201283 A1 | | 12/2016 | |
| EP | 3300208 A1 | * | 3/2018 | B60L 7/14 |

OTHER PUBLICATIONS

Power supply apparatus for aerospace.*
(Continued)

*Primary Examiner* — Rexford N Barnie
*Assistant Examiner* — Terrence R Willoughby
(74) *Attorney, Agent, or Firm* — MUNCY, GEISSLER, OLDS & LOWE, P.C.

(57) ABSTRACT

A power supply architecture for powering aircraft actuators includes a single-phase on-board electricity network is connected by a power supply circuit to an electric motor of an actuator, supercapacitor associated with an electronic circuit for managing the operation of the supercapacitor, and a downstream converter device for connecting to the motor. The power supply circuit includes in succession an upstream converter device for converting the voltage of the on-board electricity network into a voltage adapted to the power supply circuit downstream therefrom. The downstream converter device is reversible, so as to convert voltage both when the motor is operating in motor mode and also when the motor is operating in generator mode. The downstream converter device is arranged selectively to have a voltage-
(Continued)

decreasing function and to have a voltage-increasing function regardless of the mode of operation of the motor.

15 Claims, 5 Drawing Sheets

(51) Int. Cl.

| | |
|---|---|
| ***H02J 1/082*** | (2026.01) |
| ***H02J 1/14*** | (2026.01) |
| ***H02J 7/34*** | (2006.01) |
| ***H02M 1/00*** | (2007.01) |
| ***H02M 1/42*** | (2007.01) |
| ***H02M 3/158*** | (2006.01) |
| ***H02M 3/335*** | (2006.01) |
| ***H02M 7/797*** | (2006.01) |
| *H02J 105/30* | (2026.01) |

(52) U.S. Cl.

CPC ......... *H02M 1/007* (2021.05); *H02M 1/4208* (2013.01); *H02M 3/1582* (2013.01); *H02M 3/33573* (2021.05); *H02M 3/33584* (2013.01); *H02M 7/797* (2013.01); *H02J 2105/32* (2026.01)

(56) References Cited

OTHER PUBLICATIONS

Mishra Rahul et al, “Comprehensive review of control schemes for battery and super-capacitor energy storage system”, 2017 7th International Conference On Power Systems (ICPS), IEEE,Dec. 21, 2017, pp. 702-707.

Gorji Saman A et al, “Topologies and Control Schemes of Bidirectional DC-DC Power Converters: An Overview”, IEEE Access,vol. 7, Aug. 23, 2019, pp. 117997-118019.

Xavier Roboam et al, “More Electricity in the Air: Toward Optimized Electrical Networks Embedded in More-Electrical Aircraft”, IEEE Industrial Electronics Magazine, IEEE, US, vol. 6, No. 4, Dec. 2012, pp. 6-17.

Raman S Raghu et al, “Ideas for future electric aircraft system”, 2015 6$^{th}$ International Conferene on Power Electronics Systems and Applications, Dec. 15, 2015, pp. 1-4.

* cited by examiner

A
E1
E2
1
T
100
1
1
V
1
T
100
1
V
1
1

POWER SUPPLY SYSTEM FOR AN AIRCRAFT ACTUATOR

The present invention relates to the field of aviation, and more particularly to electrically actuating aircraft equipment such as: an undercarriage, a brake of an undercarriage wheel, a thrust reverser, a primary or secondary movable flight control surface such as an aileron or a flap, . . . .

† Translation of the title as established ex officio.

BACKGROUND OF THE INVENTION

Aircraft often include both a three-phase electricity network and also at least one single-phase electricity network.

The single-phase electricity network is considered not to be sufficiently powerful for powering movable equipment of the aircraft, such as flight control surfaces, thrust reversers, brakes, and undercarriages. The three-phase electricity network is therefore used to actuate movable equipment by delivering the necessary power to the electromechanical actuators used for moving movable equipment between different service positions.

Thus, the architecture of the power supply system for such actuators generally includes respective power supply circuits connecting the motors of the actuators to the three-phase electricity network. Such a power supply circuit usually comprises:

- an input filter for eliminating electrical disturbances (voltage surges, current surges) that are conveyed by the three-phase network and to which the components of the power supply are sensitive;
- a rectifier of the diode bridge type, the transformer/rectifier type, or of the power factor correction (PFC) type;
- a current limiter;
- an LC-type damping filter for limiting inrush current on starting and for preventing the input voltage from collapsing;
- a decoupling capacitor;
- a three-phase inverter;
- a dissipation or braking resistor; and
- an inverter output filter.

Power requirements appear in the form of peaks as shown in FIG. 1, which is a plot as a function of time showing the power consumption of an aileron actuator. The power needed at the power peaks is supplied by the three-phase network, such that all of the components of the power supply system need to be rated to absorb these power peaks. This results in weight that is considerable, which constitutes a major drawback for aviation applications.

OBJECT OF THE INVENTION

A particular object of the invention is to enable aircraft actuators to be powered while limiting on-board weight.

SUMMARY OF THE INVENTION

To this end, the invention provides an architecture according to claim 1.

Thus, it is the supercapacitor that supplies the bulk of the power needed by the motor during power peaks, while the network serves, where necessary, to top up this power or to maintain supercapacitor charge or to supply power to the motor other than during power peaks. Also, the supercapacitor is recharged by the motor in generator mode while aerodynamic forces are acting on the movable equipment associated with the actuator, and the downstream converter device serves to regulate voltage and current firstly at the terminals of the motor while it is operating in motor mode, and secondly at the terminals of the supercapacitor while the motor is operating in generator mode. There is thus no need for all of the architecture to be rated as a function of the power peaks, but only its portion situated downstream from the supercapacitor. This results in a saving of weight, and consequently in a reduction in the consumption of fuel used for propelling the aircraft.

The invention also provides an aircraft including both a three-phase on-board electricity network and also a single-phase on-board electricity network, which single-phase network forms a part of an actuator power supply architecture as specified above.

Other characteristics and advantages of the invention appear on reading the following description of a particular and nonlimiting implementation of the invention.

BRIEF DESCRIPTION OF THE DRAWINGS

Reference is made to the accompanying drawings, in which.

DETAILED DESCRIPTION OF THE INVENTION

Figure 9:
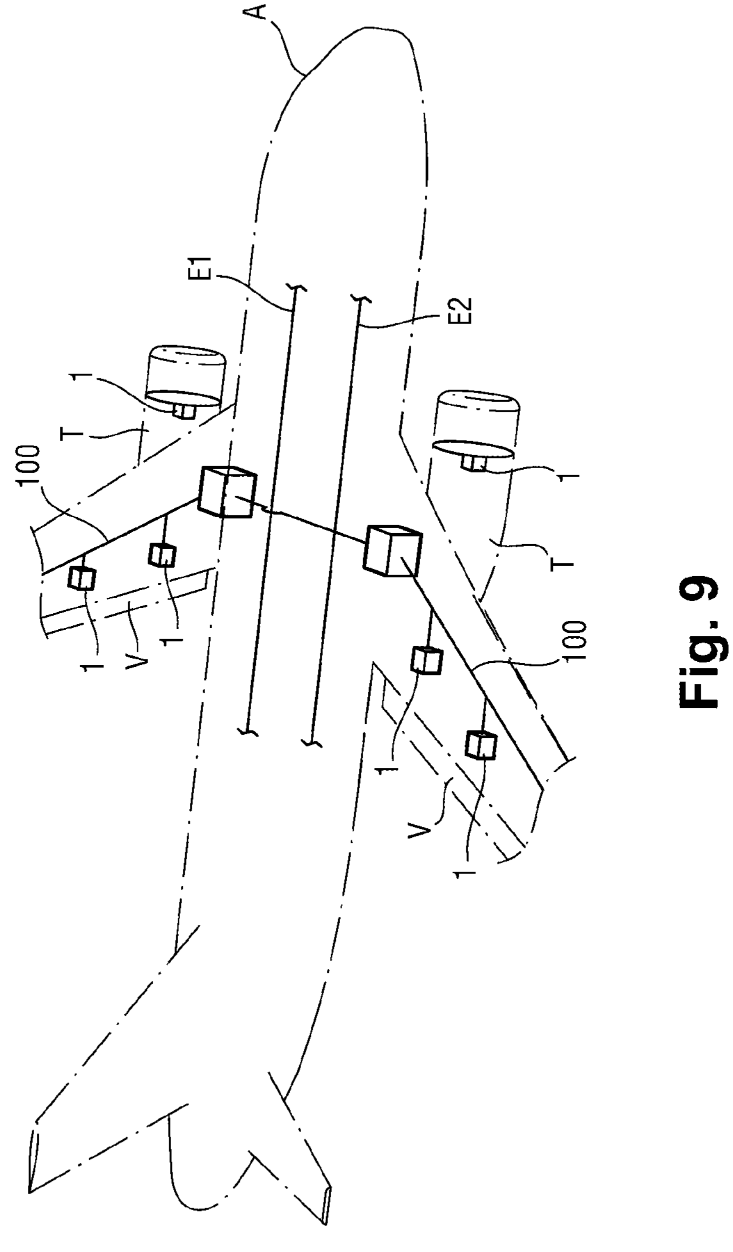
FIG. 9 is a diagrammatic view of an aircraft of the invention.

With reference to FIG. 9, the invention is described below in application to an aircraft A having two on-board electricity networks, namely a three-phase electricity network E1 and a single-phase electricity network E2. By way of example, and depending on the embodiment in question, the three-phase electricity network E1 operates at an alternating current (AC) voltage of 115 volts (V) or 230 V, and the single-phase electricity network E2 operates at a direct current (DC) voltage of 28 V or 115 V. The aircraft A has movable equipment, including movable flight control surfaces V (primary controls) and thrust reversers T. The moving equipment is moved between various different service positions by electromechanical actuators 1.

The aircraft A is provided with a power supply architecture for powering the electromechanical actuators, and the single-phase electricity network E2 forms part of this architecture.

The power supply architecture has at least one power supply circuit, given overall reference 100, connecting the single-phase electricity network E2 to each electric motor 2 of each of the actuators 1. The circuit of the motor 2 of each actuator 1 is arranged to operate both in a motor mode in which the motor 1 transforms the electrical energy powering it into mechanical energy moving the movable equipment and also in a generator mode in which the motor 1 transforms the mechanical energy that is transmitted thereto by the movable equipment into electrical energy. For simplification purposes, the invention is described below in application to powering a single motor; nevertheless it goes without saying that the power supply architecture can be adapted to powering a plurality of motors. By way of example, this applies when the movable equipment is moved by a plurality of actuators, each including a single motor, or by a single actuator having a plurality of motors. The power supply architecture preferably has as many power supply circuits as there are actuators acting on the same piece of equipment.

The power supply circuit 100 comprises in succession an upstream converter device 110, an energy storage device 120 connected by an internal bus to the upstream converter device 110, and a downstream converter device 130 connected by an internal bus to the energy storage device 120 and to the motor.

The energy storage device 120 comprises supercapacitors 121 and an electronic circuit 122 for managing the operation of the supercapacitors 121. The electronic circuit 122 is itself known, and it monitors the charging and discharging of the supercapacitors 121 while ensuring that their levels of charge are balanced.

The term "converter device" is used to cover any electrical/electronic device serving to transform an input voltage into one or more output voltages.

More precisely, the upstream converter device 110 is arranged to convert the voltage of the single-phase electricity network E2 into a first internal bus voltage for powering the supercapacitors 121 and also the upstream converter device, except during power peaks, with the first internal bus voltage being a single-phase DC voltage. The upstream converter device 110 is designed to compensate for energy lost by the supercapacitors 121 as a result of leakage currents, and to supply additional energy to the downstream converter device 130 during energy peaks.

Also, the downstream converter device 130 is reversible, so as to convert voltage both when the motor 2 is operating in motor mode and also when the motor 2 is operating in generator mode. The downstream converter device 130 is arranged selectively to have a voltage-decreasing function (buck) and to have a voltage-increasing function (boost) regardless of the mode of operation of the motor 2, in such a manner as to enable the supercapacitors 121 to power the motor 2 when it is operating in motor mode and to be recharged by the motor 2 when it is operating in generator mode. The downstream converter device 130 is thus arranged firstly to convert the first internal bus voltage into a three-phase AC voltage for powering windings of the motor 2 so as to drive the motor in motor mode, and secondly to convert a three-phase AC voltage supplied by the motor when it is operating in generator mode into a voltage that is suitable for recharging the supercapacitors 121. Specifically, the downstream converter device 130 must enable input voltage and output voltage to be regulated regardless of the mode of operation under consideration: this is particularly advantageous when operating in motor mode, since it is then possible either to decrease the voltage so as to prevent a surge above the maximum voltage that is acceptable for the supercapacitors 121, or else to raise the voltage in order to accelerate charging of the supercapacitors 121 (while remaining below the maximum voltage that is acceptable for the supercapacitors 121).

Figures 3, 4:
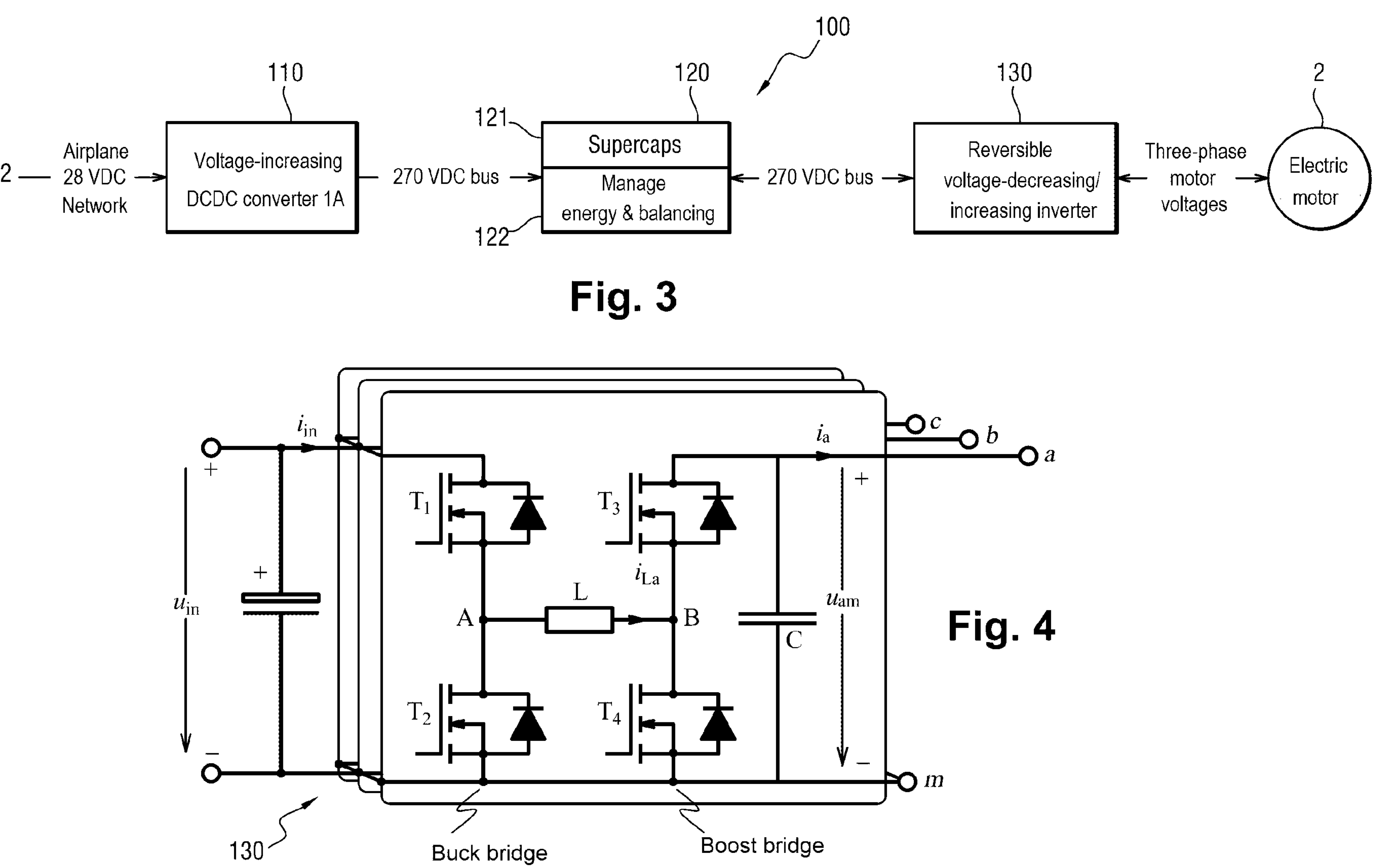
FIG. 3 is a block diagram of the actuation system for actuating aircraft equipment in a first embodiment of the invention, with a DC single-phase on-board network and a high-voltage internal bus.
FIG. 4 is a schematic view of the downstream converter device of the actuation system in the first embodiment of the invention.

In the first embodiment shown in FIG. 3, the single-phase electricity network E2 supplies low-voltage DC at 28 V and the first internal bus voltage operates at a high-voltage DC equal to 270 V.

In this example, the upstream converter device 110 is a voltage-increasing DC/DC converter that is designed to convert the DC single-phase voltage at 28 V into the DC single-phase voltage at 270 V and that is connected to the energy storage device 120 by an internal bus at the first internal bus voltage.

The downstream converter device 130 comprises an inverter of buck-boost topology, and more precisely of Y-buck-boost topology, as shown in FIG. 4. For each phase of the motor 2, this inverter comprises a first bridge with transistors T1 and T2 (buck bridge) having a mid-point connected via an inductor to a mid-point of a second bridge having transistors T3 and T4 (boost bridge) with a capacitor connected in parallel. The inverter is controlled in known manner, e.g. by performing the control method described in document FR-A-3 066 660.

Figures 5, 6:
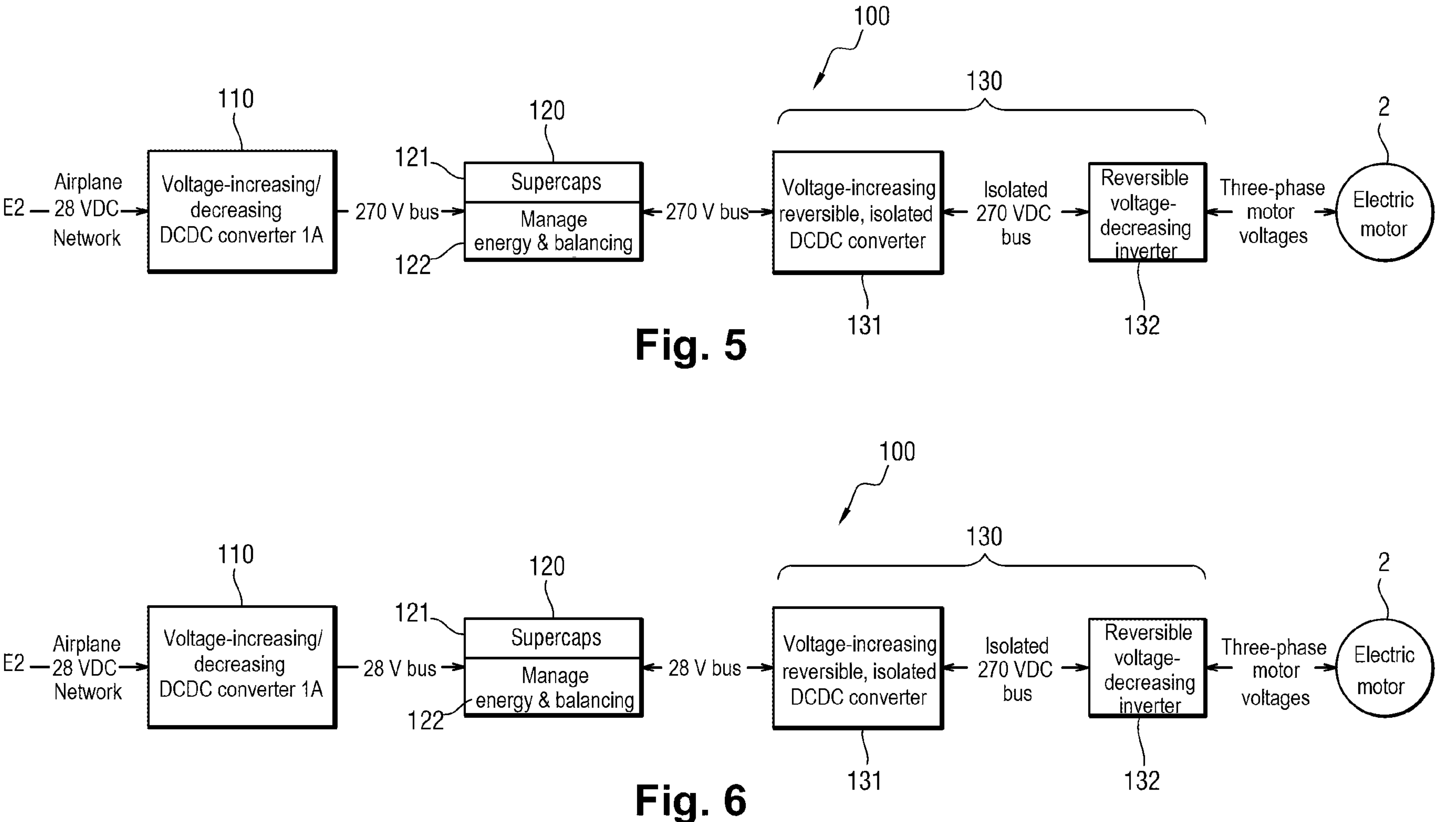
FIG. 5 is a block diagram of the actuation system in a second embodiment of the invention, the downstream converter device being of a structure different from that of FIG. 4.
FIG. 6 is a block diagram of a third embodiment of the invention, with a DC single-phase on-board network, the downstream converter device of the second embodiment, and a low-voltage internal bus.

In the second embodiment, and with reference to FIG. 5, the downstream converter device 130 comprises a DC/DC converter 131 and a voltage-decreasing inverter 132 together replacing the buck-boost type inverter of FIG. 4.

The DC/DC converter 131 is arranged to increase voltage, to be reversible, and to be isolated, and it is connected to the energy storage device 121 by an internal bus at the first internal bus voltage, which is 270 VDC in this example. The DC/DC converter serves to regulate the voltage at the terminals of the supercapacitors 121. In this example, the DC/DC converter 131 is of the dual active bridge type.

The voltage-decreasing inverter 132 is reversible, and it is connected to the motor 2.

The DC/DC converter 131 and the voltage-decreasing inverter 132 are connected together by an isolated internal bus at the first internal bus voltage, which is 270 VDC in this example.

As above, the upstream converter device 110 is a voltage-increasing DC/DC converter that is designed to convert the DC single-phase voltage at 28 V into the DC single-phase voltage at 270 V and that is connected to the energy storage device 120 by an internal bus at the first internal bus voltage.

It should be observed that

- in generator mode, the voltage applied to the supercapacitors 121 is regulated so as to avoid exceeding the maximum voltages and currents that the supercapacitors 121 can withstand;
- in motor mode, the acceptable variation in voltage on the internal bus is greatly enlarged (within the acceptable current limit) for a given amplitude of the phase voltages from the motor 2 in order to reach the speed range desired for the motor.

The third embodiment of FIG. 6 is identical to the second embodiment except in that the energy storage device 120 is connected to the upstream converter device 110 by an internal bus at a first voltage that is relatively low, specifically 28 VDC, and it is connected to the downstream converter device 130 by an internal bus at the first voltage, i.e. 28 VDC. The converter device 110 and the DC/DC converter 131 are adapted to these voltage values.

Thus, the DC/DC converter 131 is arranged to increase voltage, to be reversible, and to be isolated, and it is connected to the energy storage device 121 by an internal bus at the first internal bus voltage, which is 270 VDC in this example. The DC/DC converter 131 is arranged to increase the voltage considerably in order to power the inverter 132 in motor mode and in order to regulate the voltage at the terminals of the supercapacitors 121 in generator mode. In this example, the DC/DC converter 131 is of the dual active bridge type.

The galvanic isolation of the DC/DC converter 131 serves to provide a barrier between the supercapacitors 121 and the motor 2 for preventing uncontrolled supply of energy to the motor 2. This also makes it possible to generate very low DC voltage DC by means of the inverter 132 in order to verify that it is operable before it is put into use ("power built-in test"/"in-flight test").

Figures 7, 8:
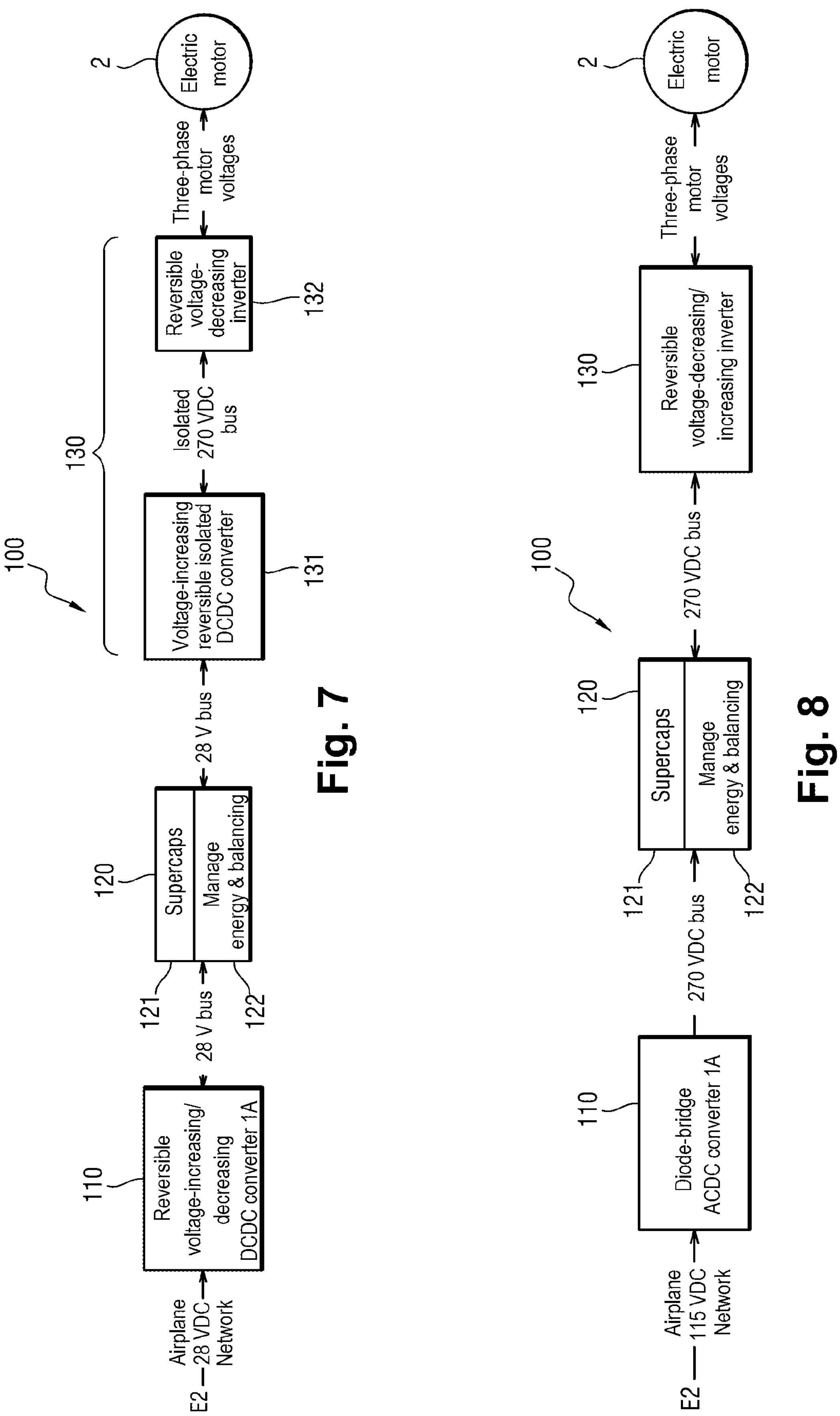
FIG. 7 is a block diagram of a fourth embodiment of the invention that is identical to the third embodiment, except that the upstream converter device is reversible.
FIG. 8 is a block diagram of the actuation system for actuating aircraft equipment in a fifth embodiment of the invention, for an AC single-phase on-board network.

In the fourth embodiment shown in FIG. 7, the upstream converter device 110 is connected to the energy storage device 120 by an internal bus at a first voltage that is relatively low, which is 28 VDC in this example, and it is arranged to have both a voltage-decreasing function and a voltage-increasing function in order to enable energy to be passed from the supercapacitors 121 to the single-phase electricity network E2.

As above, the downstream converter device 130 comprises a DC/DC converter 131 and a voltage-decreasing inverter 132.

The DC/DC converter 131 is arranged to increase voltage, to be reversible, and to be isolated, and it is connected to the energy storage device 121 by an internal bus at the first internal bus voltage, which is 28 VDC in this example. The voltage-decreasing inverter 132 is reversible and it is connected firstly to the motor 2 and secondly to the DC/DC converter 131 by an isolated internal bus at a relatively high second internal bus voltage, which is 270 VDC in this example.

It is then possible to store energy in storage means that are distributed within the aircraft and that are connected to the single-phase electricity network E2.

In the fifth embodiment of FIG. 8, the single-phase electricity network E2 delivers AC at 115 VAC, and the upstream converter device 110' comprises a passive half-wave rectifier or a power factor correction rectifier. The remainder of the power supply circuit 100 is identical to that of FIG. 3.

In all of the embodiments, the supercapacitors 121, the circuit 122 for managing the operation of the supercapacitors 121, the upstream converter device 110, 110', and at least a portion of the downstream converter device 130 all form parts of a single electronic circuit including at least one processor.

Figure 1:
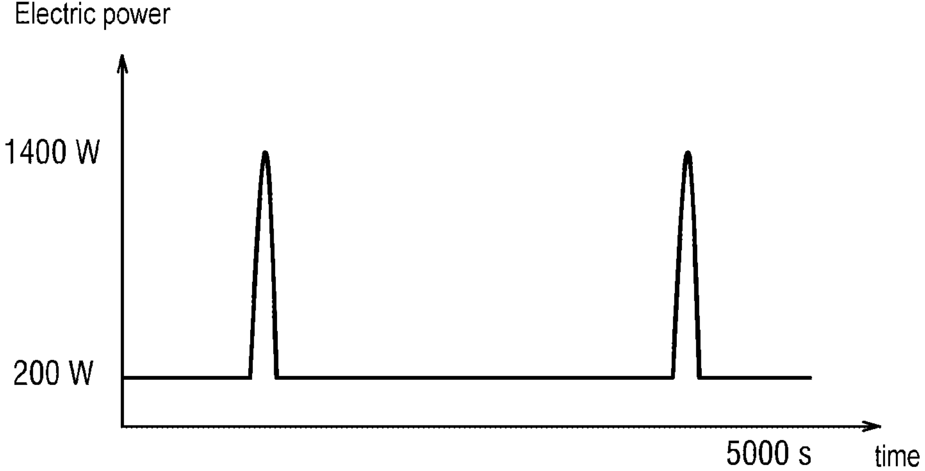
FIG. 1 is a plot as a function of time showing the power consumption of an aileron actuator.
Figure 2:
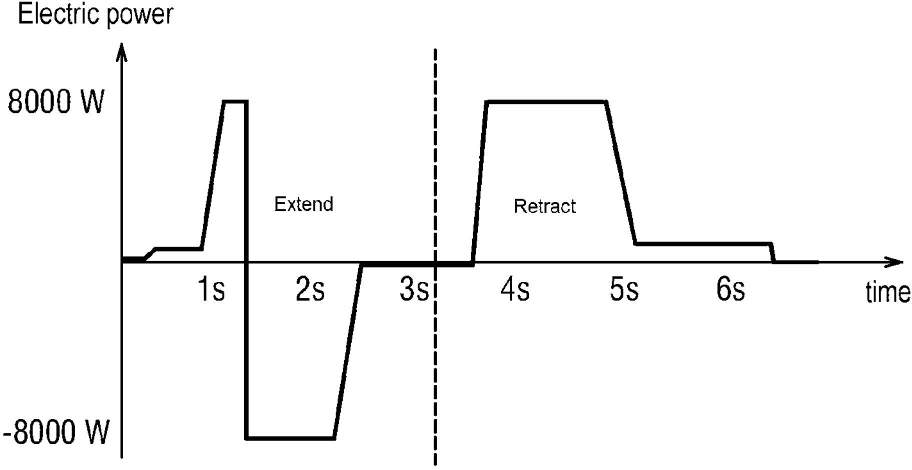
FIG. 2 is a plot as a function of time showing the power that needs to be supplied to and the power that is returned by an actuator of a thrust reverser.

In order to actuate the thrust reverser T, FIG. 2 shows that the actuation sequence comprises:

- a motor, first stage in which the supercapacitors 121 need to deliver a relatively short power peak to initiate movement of the thrust reverser T towards its extended position;
- a generator, second stage in which aerodynamic forces entrain the thrust reverser T to its extended position and in which the motor 2 acting as a generator recharges the supercapacitors 121; and
- a motor, third stage in which the supercapacitors 121 need to deliver a relatively long power peak in order to bring the thrust reverser T back from its extended position to its retracted position.

Preferably, in this application, the supercapacitors 121 are configured so that they are not fully charged during aircraft flight time, with the supercapacitors being recharged fully during the motor, second stage. This is valid for any application performing an actuation sequence that begins with a generator or motor stage at relatively low power, followed by a generator stage.

When there is a risk of over-saturating the supercapacitors during the generator stage, it is preferable to provide an energy-dissipating resistor connected to the downstream converter device in order to dissipate the energy produced while the motor is operating in generator mode and the supercapacitors are saturated.

Naturally, the invention is not limited to the implementation described, but covers any variant coming within the ambit of the invention as defined by the claims.

In particular, the power supply architecture may be of structure different from that described.

For example, the downstream converter device may comprise a converter of boost, buck-boost, Ćuk, . . . topology.

Provision may be made for the supercapacitors to be configured so that they can deliver power peaks on their own, with the on-board electricity network serving only to compensate for losses of charge due to leakage current.

It is possible to pre-charge the supercapacitors prior to flight, or to charge them only while in flight, depending on flight duration.

The invention is applicable to any type of equipment for electrically powering aircraft equipment, and in particular movable equipment such as: an undercarriage, a brake of an undercarriage wheel, a thrust reverser, a primary or secondary movable flight control surface such as an aileron or a flap, . . . .

The invention claimed is:

1. A power supply architecture for powering aircraft actuators, the architecture comprising a single-phase on-board electricity network connected by a power supply circuit to an electric motor of at least one actuator, the power supply circuit comprising in succession an upstream converter device for converting a voltage of the single-phase on-board single-phase electricity network into a voltage adapted to the power supply circuit downstream therefrom, at least one supercapacitor associated with an electronic circuit for managing the operation of the supercapacitor, and a downstream converter device for connecting to the motor; the downstream converter device being reversible, so as to convert voltage both when the motor is operating in motor mode and also when the motor is operating in generator mode, the downstream converter device being arranged selectively to have a voltage-decreasing function and to have a voltage-increasing function regardless of the mode of operation of the motor, in such a manner as to enable the supercapacitor to power the motor when operating in motor mode and to be recharged by the motor when operating in generator mode, wherein the on-board single-phase electricity network delivers a DC voltage, the upstream converter device comprising a DC/DC converter arranged to be reversible and to have both a voltage-decreasing function and also a voltage-increasing function to allow energy to be delivered from the supercapacitor to the on-board electricity network.

2. The architecture according to claim 1, wherein the downstream converter device comprises an inverter of buck-boost topology.

3. The architecture according to claim 1, wherein the downstream converter device comprises both a reversible and isolated voltage-increasing DC/DC converter connected to the supercapacitor and also a reversible voltage-decreasing inverter connected in series with the voltage-increasing DC/DC converter and with the motor.

4. The architecture according to claim 3, wherein the DC/DC converter is of the dual active bridge type.

5. The architecture according to claim 3, wherein the voltage-increasing DC/DC converter is connected to the reversible voltage-decreasing inverter by an isolated high-voltage DC bus.

6. The architecture according to claim 3, wherein the voltage-decreasing inverter is incorporated in an electronic power circuit of the motor.

7. The architecture according to claim 1, wherein the upstream converter device is configured to compensate supercapacitor energy loss due to leakage currents.

8. The architecture according to claim 1, wherein the on-board electricity network delivers an AC voltage, the upstream converter comprising a half-wave passive rectifier or a power factor correction rectifier.

9. The architecture according to claim 1, wherein the supercapacitor is connected to the upstream converter device and to the downstream converter device by respective high voltage DC busses.

10. The architecture according to claim 1, wherein the supercapacitor is connected to the upstream converter device and to the downstream converter device by respective low voltage DC busses.

11. The architecture according to claim 1, wherein the supercapacitors, the circuit for managing the operation of the supercapacitor, the upstream converter device, and at least a portion of the downstream converter device all form parts of a single electronic circuit including at least one processor.

12. The architecture according to claim 1, wherein the supercapacitor is configured not to be fully charged during aircraft flight time.

13. The architecture according to claim 1, wherein an energy-dissipating resistor is connected to the downstream converter device in order to dissipate the energy produced while the motor is operating in generator mode and the supercapacitor is saturated.

14. An aircraft including both a three-phase on-board electricity network and also a single-phase on-board electricity network, which single-phase network forms a part of the actuator power supply architecture according to claim 1 used in the aircraft to power actuators of the aircraft.

15. A power supply architecture for powering aircraft actuators, the architecture comprising a single-phase on-board electricity network connected by a power supply circuit to an electric motor of at least one actuator, the power supply circuit comprising in succession an upstream converter device for converting a voltage of the single-phase on-board electricity network into a voltage adapted to the power supply circuit downstream therefrom, at least one supercapacitor associated with an electronic circuit for managing the operation of the supercapacitor, and a downstream converter device for connecting to the motor; the downstream converter device being reversible, so as to convert voltage both when the motor is operating in motor mode and also when the motor is operating in generator mode, the downstream converter device being arranged selectively to have a voltage-decreasing function and to have a voltage-increasing function regardless of the mode of operation of the motor, in such a manner as to enable the supercapacitor to power the motor when operating in motor mode and to be recharged by the motor when operating in generator mode, wherein the downstream converter device comprises both a reversible and isolated voltage-increasing DC/DC converter connected to the supercapacitor and also a reversible voltage-decreasing inverter connected in series with the voltage-increasing DC/DC converter and with the motor.

* * * * *